(12) United States Patent
Sodagar

(10) Patent No.: US 11,750,676 B2
(45) Date of Patent: Sep. 5, 2023

(54) NETWORK-BASED MEDIA PROCESSING (NBMP) DEPLOYMENT WITH FRAMEWORK FOR LIVE UPLINK STREAMING (FLUS) AND 5G APPLICATION FUNCTION (AF)

(71) Applicant: Tencent America LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 85 days.

(21) Appl. No.: 17/472,297

(22) Filed: Sep. 10, 2021

(65) Prior Publication Data

US 2022/0182435 A1 Jun. 9, 2022

Related U.S. Application Data

(60) Provisional application No. 63/121,830, filed on Dec. 4, 2020.

(51) Int. Cl.
*H04L 65/65* (2022.01)
*H04L 65/1069* (2022.01)
(Continued)

(52) U.S. Cl.
CPC .......... *H04L 65/65* (2022.05); *H04L 65/1063* (2013.01); *H04L 65/1069* (2013.01); *H04L 65/611* (2022.05)

(58) Field of Classification Search
CPC ... H04L 65/65; H04L 65/611; H04L 65/1063; H04L 65/1069; H04L 65/1066; H04L 65/61
See application file for complete search history.

(56) References Cited

U.S. PATENT DOCUMENTS

2018/0367579 A1 12/2018 Kolan et al.
2021/0320955 A1* 10/2021 Kolan ............... H04L 65/60

FOREIGN PATENT DOCUMENTS

WO WO 2020/092174 A1 5/2020
WO WO 2020/102296 A1 5/2020
WO WO 2020/166323 A1 8/2020

OTHER PUBLICATIONS

3GPP TR 26.939 V16.1.0 (Sep. 2019) 3rd Generation Partnership Project; Technical Specification Group Services and System Aspects; Guidelines on the Framework for Live Uplink Streaming (FLUS); (Release 16) (Year: 2019).*
(Continued)

*Primary Examiner* — Wing F Chan
*Assistant Examiner* — Billy H Ng
(74) *Attorney, Agent, or Firm* — ARENTFOX SCHIFF LLP

(57) ABSTRACT

A method of network-based media processing (NBMP) deployment with a framework for live uplink streaming (FLUS) and a fifth-generation media streaming (5GMS) application function (AF) can include establishing a provisioning session by a 5GMS application provider with the 5GMS AF in which a 5GMS application provider configures the 5GMS AF for a network-based media processing, configuring a FLUS sink by the 5GMS AF for the network-based media processing, selecting the FLUS sink by a FLUS source during a FLUS source discovery process, establishing a FLUS session by the FLUS source with the FLUS sink, and starting an uplink streaming by the FLUS source to the FLUS sink where media content of the uplink streaming is processed with the network-based media processing.

20 Claims, 10 Drawing Sheets

(51) Int. Cl.
   *H04L 65/1063* (2022.01)
   *H04L 65/611* (2022.01)

(56) References Cited

OTHER PUBLICATIONS

3GPP TS 28.238 V16.6.2 (Oct. 2020), 3rd Generation Partnership Project; Technical Specification Group Services and System Aspects, Uplink Streaming (Release 16), 51 pgs.
The 3GPP FLUS Management Object (3GPP TS 26.238 V16.6.2, Section 5.2.1.3), 3 pgs.
3GPP TS 26.501 V16.5.0 (Sep. 2020), 3rd Generation Partnership Project, Technical Specification Group Services and System Aspects; 5G Media Streaming (5GMS); General description and architecture (Release 16), 78 pgs.
SC29WG11_N19062-NBMP-FDIS-wISODISedits-clean. Text of ISO/IEC FDIS 23090-8 Network-based media processing. Jan. 2020. 105 pgs.
23090-8—Electronic Attachment, 33 pgs.
International Search Report and Written Opinion dated Dec. 16, 2021 in International Application No. PCT/US 21/51558, citing documents AA-AB and AO-AQ therein, 58 pgs.

* cited by examiner

NETWORK-BASED MEDIA PROCESSING (NBMP) DEPLOYMENT WITH FRAMEWORK FOR LIVE UPLINK STREAMING (FLUS) AND 5G APPLICATION FUNCTION (AF)

INCORPORATION BY REFERENCE

This present disclosure claims the benefit of priority to U.S. Provisional Application No. 63/121,830, "Deployment Methods of NBMP with FLUS and 5G Application Function" filed on Dec. 4, 2020, which is incorporated by reference herein in its entirety.

TECHNICAL FIELD

The present disclosure relates to network-based media processing (NBMP) with a framework for live uplink streaming (FLUS) over a 5G media streaming (5GMS) architecture.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Multimedia service providers face the challenge of adapting their services to multiple cloud and network service providers to reach their customers. These cloud and network service providers oftentimes define their own application programing interfaces (APIs) to assign compute resources to their customers. The network-based media processing (NBMP) standard is being developed to address fragmentation and offer a unified way to perform media processing on top of any cloud platform and on any IP network. NBMP defines a workflow manager that can use implementations of ready-made media processing functions and compose them together to create a media processing workflow.

The 3rd Generation Partnership Project (3GPP) has developed standards for a 5G media streaming (5GMS) architecture. The 5GMS architecture can support services that include mobile network operator (MNO) and third-party downlink and uplink media streaming services. The 5GMS architecture provides related network and user equipment (UE) functions and APIs.

3GPP also developed a framework for live uplink streaming (FLUS) that can be used to set up services that allow an end user to stream live feeds into a network or to another end user.

SUMMARY

Aspects of the disclosure provide a method of network-based media processing (NBMP) deployment with a framework for live uplink streaming (FLUS) and a fifth-generation media streaming (5GMS) application function (AF). The method can include establishing a provisioning session by a 5GMS application provider with the 5GMS AF in which the 5GMS application provider configures the 5GMS AF for a network-based media processing, configuring a FLUS sink by the 5GMS AF for the network-based media processing, selecting the FLUS sink by a FLUS source during a FLUS source discovery process, establishing a FLUS session by the FLUS source with the FLUS sink, and starting an uplink streaming by the FLUS source to the FLUS sink where media content of the uplink streaming is processed with the network-based media processing.

In an embodiment, the 5GMS application provider can configure the 5GMS AF with an NBMP workflow description document (WDD) corresponding to the network-based media processing. In an example, the configuring the FLUS sink by the 5GMS AF can include configuring the FLUS sink and instantiating an NBMP workflow in the FLUS sink based on the NBMP WDD corresponding to the network-based media processing. In an embodiment, the configuring the FLUS sink by the 5GMS AF includes providing an address of the FLUS source and an NBMP WDD corresponding to the network-based media processing by the 5GMS AF to the FLUS sink, wherein no instantiation of an NBMP workflow for the network-based media processing is performed at the PLUS sink.

In an embodiment, the FLUS source discovery process can include publishing the FLUS sink by the 5GMS AF to a FLUS sink discovery server, and discovering the FLUS sink by the FLUS source among one or more FLUS sinks listed on the FLUS sink discovery server wherein the FLUS source selects the FLUS sink based on information on the FLUS sink discovery server that the FLUS sink is capable of performing the network-based media processing.

In an embodiment, the establishing the FLUS session by the FLUS source with the FLUS sink includes requesting by a 5GMS aware application at a user equipment (UE) for instantiation of an NBMP workflow for the network-based media processing, and transmitting a request for the instantiation of the NBMP workflow for the network-based media processing by the FLUS source at the UE to the FLUS sink with an NBMP WDD corresponding to the NBMP workflow included in the request.

In an embodiment, the establishing the FLUS session by the FLUS source with the FLUS sink includes when the FLUS sink is configured with an address of the FLUS source and an NBMP WDD corresponding to the network-based media processing by the 5GMS AF, in response to a request for establishing the FLUS session from the FLUS source including the address of the FLUS source, instantiating by the FLUS sink an NBMP workflow based on the NBMP WDD.

Aspects of the disclosure provide another method of NBMP deployment with a FLUS and a 5GMS AF. The method can include receiving at a FLUS source a signaling from a 5GMS application provider that a FLUS sink is configured for a network-based media processing, establishing a FLUS session by the FLUS source with the PLUS sink, and starting an uplink media streaming session by the FLUS source with the FLUS sink to stream media content from the FLUS source to the FLUS sink where the media content is processed with the network-based media processing.

Aspects of the disclosure provide another method of NBMP deployment with a FLUS and a 5GMS AF. The method can include receiving a configuration for network-based media processing at a FLUS sink from the 5GMS AF, establishing a FLUS session between a FLUS source at a user equipment (UE) and the FLUS sink in response to receiving a request from the FLUS source, and receiving media content of an uplink media streaming at the FLUS sink from the FLUS source. The media content of the uplink media streaming is processed with the network-based media processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
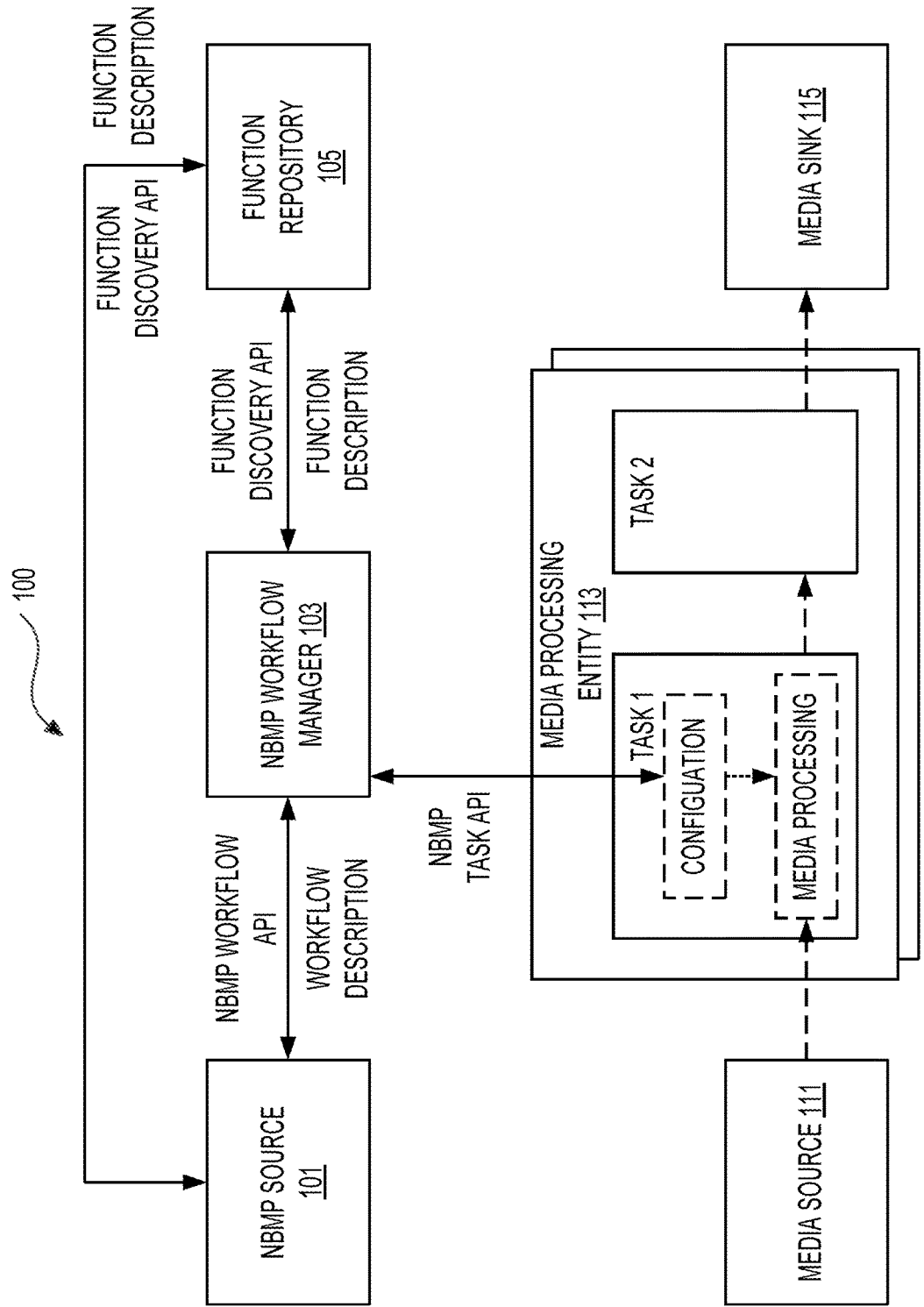
FIG. 1 shows an exemplary network-based media processing (NBMP) system (100) according to an embodiment of the disclosure.

A Moving Picture Experts Group (MPEG) Network-Based Media Processing (NBMP) project has developed a standard for network-based media processing: ISO/IEC JTC1/SC29/WG11/N19062, January 2020, Brussels, BE, FDIS/23090-8, Network-Based Media Processing. This NBMP standard is incorporated by reference herein in its entirety.

The 3rd Generation Partnership Project (3GPP) has developed a standard specifying a 5G media streaming architecture (5GMSA): 3GPP TS 26.501, 5G Media Streaming (5GMS), General description and architecture (version 16.4.0, Release 16). This 5GMSA standard is incorporated by reference herein in its entirety. The 5GMSA provides a general architecture for downlink and uplink streaming of media from a 5G network to devices and vice versa.

3GPP has also developed a standard specifying a framework for live uplink streaming (FLUS): 3GPP TS 26.238, Uplink Streaming (version 16.2.0, Release 16). This FLUS standard is incorporated by reference herein in its entirety. The FLUS provides an uplink streaming in a 5G network for multimedia telephony service for IP multimedia subsystem (MIST) and non-MISI terminals.

In an NBMP system, an NBMP Source can be an entity providing a workflow description to a workflow manager to create, run, manage, and monitor a media workflow. The interaction between the NBMP Source and the workflow manager is through a set of NBMP operation APIs. In a 5GMSA, a source device of media streams can establish an uplink session with an application function/application server (AF/AS) pair in a network. A receiving device also establishes a downlink session with the AF/AS pair to stream/download content from the network. In a FLUS system, a FLUS protocol can provide a mechanism for uplink streaming of multimedia content from a source device to a network and sending/distributing that content to one or more destinations.

This disclosure describes various deployment scenarios for using network-based media processing with a FLUS and a 5G application function (e.g., a 5GMS AF).

I. Network-Based Media Processing

NBMP specifies an abstraction layer for setting up and managing media processing workflows on any cloud or edge computing platform. NBMP allows content and service providers to describe, deploy, and control media processing for their content in the network/cloud. NBMP workflows are composed of multiple media processing tasks that are connected to build a direct acyclic graph to process incoming media and metadata from a media source and to produce processed media and metadata streams, which are subsequently published for consumption by media sinks.

An NBMP framework can be employed to initialize and control media processing in a network (e.g., on a cloud platform). For example, an NBMP source describes requested media processing and provides information about the nature and format of media data. In response, an NBMP workflow manager can establish a media processing workflow and inform the NBMP source that the workflow is ready, and the requested media processing can start. The media source(s) can then start transmitting media to the network for processing.

An NBMP workflow can be understood as a connected graph of media processing tasks, each of which performs a well-defined media processing operation. The workflow manager ensures the correct operation of the workflow by configuring and monitoring each task as well as a workflow output. The workflow manager is responsible for selecting media processing functions and instantiating the selected functions as tasks based on a workflow description received from the NBMP source.

FIG. 1 shows an exemplary NBMP system (100) according to an embodiment of the disclosure. The NBMP system (100) can support existing media delivery methods such as streaming, file delivery, push-based progressive download, hybrid delivery, multipath, and heterogeneous network environments. The NBMP system (100) can also enable emerging media applications by providing various cloud-based media processing capabilities such as network-assisted media quality enhancement (e.g., virtual reality (VR) stitching, video up-scaling, mobile edge encoding for adaptive streaming, and content-aware cloud transcoding), network-assisted media distribution (e.g., live media ingestion, online transcoding, and media-aware caching), network-assisted media composition (e.g., augmented video streaming, and customized media composition), immersive media handling (e.g., network aggregated point cloud media), and the like.

As shown, the NBMP system (100) can include an NBMP source (101), an NBMP workflow manager (103), a function repository (105), a media source (111), a data processing entity (MPE) (113), and a media sink (115). The NBMP system (100) can include additional media source(s), media sink(s), and/or MPEs.

The NBMP source (101) can describe, or otherwise indicate, media processing operations to be performed by the media processing entity (113). The function repository (105) can store various media processing functions. The NBMP source (101) and the NBMP workflow manager (103) can retrieve media processing functions from the function repository (105). A media processing function or a function can be used for performing a specific media processing process, such as a stitching process in a 360 video streaming service, an artificial intelligence (AI) based video up-scaling process in a video delivery service, or the like.

A media processing task or a task can be a runtime instance of a function that is executed by the MPE (113). An NBMP workflow or a workflow can be represented by a graph (e.g., a directed acyclic graph (DAG)) of one or more connected task(s) that achieve the requested media processing. The NBMP workflow manager (103) or the workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content.

Different entities (e.g., the NBMP Source (101), the workflow manager (103) and the MPE (113)) in the NBMP system (100) can use APIs to invoke and respond to media service requests as shown in FIG. 1. The APIs can include an NBMP workflow API (or a workflow API), a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

The NBMP interfaces described above can be used to create and control media processing workflows in the network. The NBMP system (100) can be split into a control plane and a media plane (or media data plane). The control plane can include the workflow API, the function discovery API, and the task API.

The workflow API can be used by the NBMP source (101) to create and control a media processing workflow. The NBMP Source (101) can use the workflow API to communicate with the workflow manager (103) for configuring and controlling media processing in the network. When the NBMP Source (101) sends a request to the workflow manager (103) by including a workflow resource (WR) in an operation of the workflow API, the workflow manager (103) can parse the WR, the included WDD and corresponding descriptors, and take the appropriate actions according to the requested operation. Then, the workflow manager (103) can acknowledge the request with a response. The workflow API operations can include creating a workflow (e.g., CreateWorkflow), updating a workflow (e.g., UpdateWorkflow), deleting a workflow (e.g., DeleteWorkflow), retrieving a workflow (e.g., Retrieve Workflow), and the like.

The function discovery API can provide the means for the workflow manager (103) and/or the NBMP Source (101) to discover media processing functions that can be loaded as part of a media processing workflow.

The task API can be used by the workflow manager (103) to configure and monitor task(s) (e.g., a task 1 and a task 2 run by the MPE (113)) at runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s) and between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks can be configured and distributed to a set of one or more MPEs (e.g., including the MPE (113)).

The set of functions provided by the function repository (105) can be read by an NBMP source (101) and the workflow manager (103). In an embodiment, the NBMP source (101) requests the creation of a workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to be created and can specify a connection map to define connections of inputs and outputs of the media processing tasks. When the workflow manager (103) receives the above information from the NBMP source (101), the workflow manager (103) can instantiate the media processing tasks based on respective function names and can connect the media processing tasks according to the connection map.

Alternatively, the NBMP source (101) can request the creation of a workflow using a set of keywords by which the workflow manager (103) can construct the workflow. Accordingly, the NBMP source (101) may not know a set of functions to be inserted into the workflow. The NBMP source (101) can request the creation of the workflow as described below. The NBMP source (101) can use the set of keywords by which the workflow manager (103) can find the appropriate functions and can specify the requirements of the workflow using a suitable workflow description.

When the workflow manager (103) receives the above information (e.g., the set of keywords) from the NBMP source (101), the workflow manager (103) can create the workflow by searching for appropriate functions using the keywords, for example, specified in a processing descriptor. The workflow manager (103) can then use other descriptors in the workflow description to provision the media processing tasks and connect the media processing tasks to create the final workflow.

A processing model of the workflow manager (103) is described below.

The workflow manager (103) can discover available media processing functions as below. The NBMP function repository (105) can provide the function discovery interface (or API) to allow external entities to query for a media processing function that can fulfil the requested processing. The workflow manager (103) can access a directory service that offers a searchable list of media processing functions. The workflow manager (103) can use the description of the media processing tasks in the workflow description to find the appropriate functions for the workflow.

The selection of the media processing tasks for the workflow can be described below. When a request for media processing is received from the NBMP source (101), the workflow manager (103) can search the function repository (105) to find the list of all available functions that can fulfil the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the time of task creation, the input-ports and output-ports can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and configure the tasks so that the tasks can be added to the workflow. The NBMP workflow manager (103) can extract the configuration data from the media processing information from the NBMP source (101) and configure the corresponding tasks. The configuration of the Tasks can be performed using a task API (e.g., NBMP task API).

Task allocation and distribution is described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2:
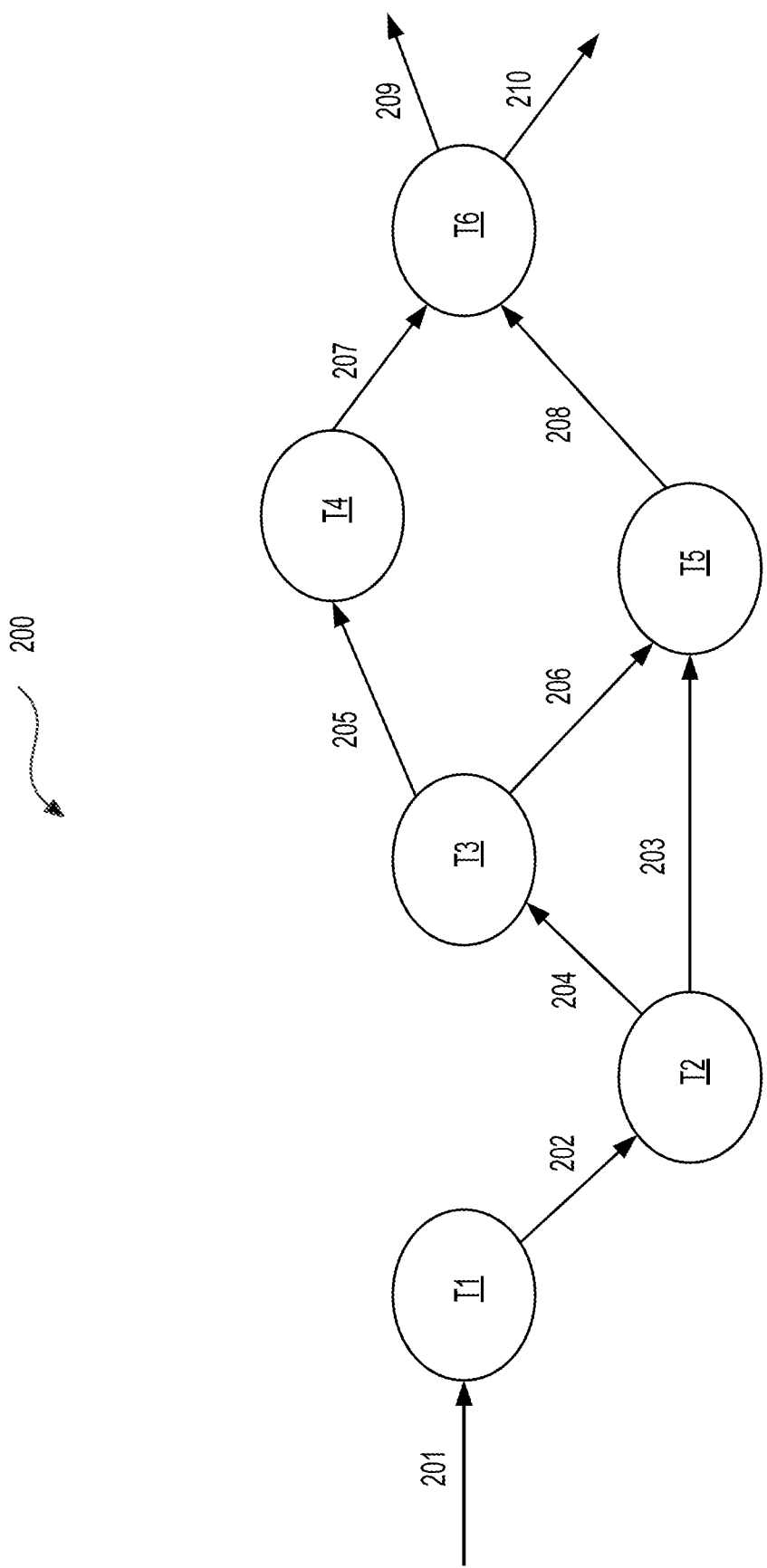
FIG. 2 shows an example workflow according to an embodiment of the disclosure.

The workflow manager (103) can generate a workflow, for example, as represented by a graph (e.g., a DAG). FIG. 2 shows an example of a graph (e.g., a DAG) (200) according to an embodiment of the disclosure. The DAG (200) can include a plurality of nodes (T1)-(T6) and a plurality of links (or connections) (202)-(208). In an example, the DAG (200) represents the workflow (200).

Each node of the DAG (200) can represent a media processing task in the workflow (200). A link (e.g., the link (202)) connecting a first node (e.g., the node (T1)) to a second node (e.g., the node (T2)) in the DAG (200A) can represent a transfer of an output of the first node (e.g., the node (T1)) as an input to the second node (e.g., the node (T2)).

In general, a workflow can include any suitable number of input(s) (or workflow input(s)) and any suitable number of output(s) (or workflow output(s)). The workflow input(s) can be connected to the media source (111), other workflow(s), and/or the like, and the workflow output(s) can be connected to the media sink (115), other workflow(s), and/or the like. The workflow (200) has an input (201) and outputs (209) and (210). The workflow (200) can have one or more outputs from intermediate nodes in some embodiments.

II. 5G Media Streaming (5GMS) System

A 5G media streaming (5GMS) system can support services including MNO and third-party downlink or uplink media streaming services. The 5GMS system can provide related network and UE functions and APIs. The 5GMS system can be functionally divided into independent components enabling different deployments with various degrees of integration between 5G MNOs and content providers.

Generally, streaming in the context of this disclosure can be defined as the delivery of time-continuous media content as the predominant media. The media content can be predominantly sent in a single direction and consumed as it is received. Additionally, the media content may be streamed as it is produced, referred to as live streaming. If the content is streamed that is already produced, it is referred to as on-demand streaming.

Figure 3:
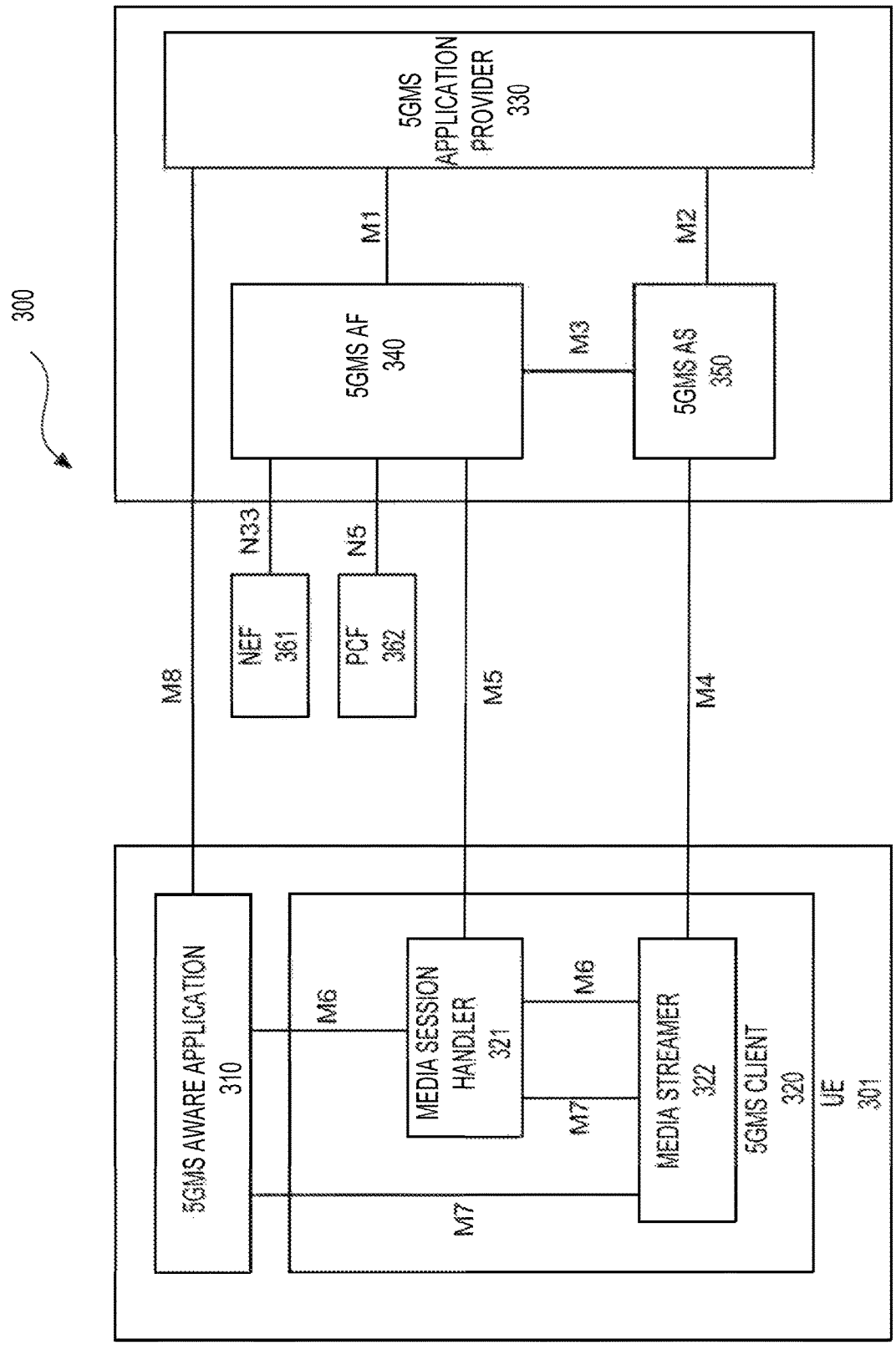
FIG. 3 shows an example of a fifth-generation media streaming (5GMS) system (300).

FIG. 3 shows an example of a 5GMS system (300). The system (300) can include a user equipment (UE) (301) and data network (DN) (302). The system (300) can be an assembly of application functions (AFs), application servers (ASs), and interfaces that support either downlink media streaming services or uplink media streaming services, or both. For downlink streaming, the DN (302) is an origin of the media, and the UE (301) acts as a consumption device. For uplink streaming, the UE (301) is an origin of the media, and the DN (302) acts as the consumption entity. In the example of FIG. 3, the system (300) is shown to be a system that supports uplink media streaming services. The components of the system (300) may be provided by an MNO as part of a 5GS and/or by a 5GMS application provider.

In some examples, the UE (301) can include a 5GMS (5GMS) aware application (310) and a 5GMS client (320). The 5GMS client (320) can include a media session handler (321) and a media streamer (322). The DN (302) can include a 5GMS application provider (330), a 5GMS application function (AF) (340), and a 5GMS application server (AS) (350). The system (300) can further include two 5G functions (e.g., specified by 3GPP 5G standards): a network exposure function (NEF) (361) and a policy control function (PCF) (362). Those elements are coupled together as shown in FIG. 3.

The 5GMS application provider (330) employs the 5GMS system (300) for streaming services. The 5GMS application provider (330) provides or is associated with the 5GMS aware-application (310) on the UE (301) to make use of the 5GMS client (320) and the network functions (340 and 350) using interfaces and APIs defined in the 5GMS system (300). For example, the 5GMS client (320) is typically controlled by the 5GMS aware application (310) (e.g. an app), which implements application or content service provider specific logic and enables a media session to be established. For example, the 5GMS application provider (330) can be an application or content-specific media functionality (e.g., media storage, consumption, transcoding, and redistribution) that uses the 5GMS system (300) to stream media from 5GMS aware applications.

The 5GMS AF (340) can be an AF similar to that defined in 3GPP TS 23.501, "System architecture for the 5G System (5GS)", clause 6.2.10 and dedicated to 5G media streaming. For example, the 5GMS AF (340) can be application function that provides various control functions to the media session handler (321) on the UE and/or to the 5GMS application provider. The 5GMS AF (340) may also relay or initiate a request for different policy or charging function (PCF) treatment or interact with other network functions via the NEF (361). There may be multiple 5GMS AFs present in a deployment and residing within the DN (302), each exposing one or more APIs.

The 5GMS AS (350) can be an AS dedicated to 5G media streaming, such as an application server hosting media functions. In various examples, there may be different realizations of 5GMS ASs, for example, a content delivery network (CDN). The 5GMS AF (340) and 5GMS AS (350) are data network (DN) functions and communicate with the UE (301) via N6 interface as defined in TS 23.501.

The 5GMS client (320) can be a UE internal function dedicated to 5G media streaming. For example, the 5GMS client (320) can be an originator of 5GMS uplink service that may be accessed through well-defined interfaces/APIs.

The 5GMS media streamer (322) can be a UE function that enables uplink delivery of streaming media content to the AS function (350) of the 5GMS application provider (330). The 5GMS media streamer (322) can interact with both the 5GMS aware application (310) for media capture and subsequent streaming, and the media session handler (321) for media session control. For example, the 5GMS media streamer captures a media on the provided input devices. The 5GMS media streamer exposes some basic controls such as capture, pause, and stop to the 5GMS aware application (310). In an example, the 5GMS AF (340) can interact with the NEF (361) for NEF-enabled API access. For example, the 5GMS AF (340) can use the NEF (361) to interact with the PCF (362).

The media session handler (321) can be a function on the UE (301) that communicates with the 5GMS AF (340) to establish, control, and support the delivery of a media session. The Media Session Handler (321) exposes APIs that can be used by the 5GMS aware application (310).

In some examples, the following interfaces are defined for 5G uplink media streaming in the system (300):

M1 (5GMS Provisioning API): External API, exposed by the 5GMS AF (340) to provision the usage of the 5G media streaming uplink streaming system and to obtain feedback.

M2 (5GMS Publish API): Optional external API exposed by the 5GMS AS (350) used when the 5GMS AS (350) in the trusted DN is selected to receive the content for the streaming service.

M3 (Internal): Internal API used to exchange information for content hosting on the 5GMS AS (350) within the trusted DN.

M4 (Uplink Media Streaming APIs): APIs exposed by a 5GMS AS (350) to the media streamer (322) to stream media content.

M5 (Media Session Handling API): APIs exposed by the 5GMS AF (340) to the media session handler (321) for media session handling, control and assistance that also include appropriate security mechanisms (e.g. authorization and authentication, and QoE metrics reporting).

M6 (UE Media Session Handling APIs): APIs that may be exposed by the media session handler (321) to the 5GMS aware application to make use of 5GMS functions.

M7 (UE Media Streamer APIs): APIs that may be exposed by the media streamer (322) to the 5GMS aware application (310) and media session handler (321) to make use of the media streamer (322), including the configuration of QoE metrics to be measured and logged, and the collection of metrics measurement logs.

M8 (Application API): application interface used for information exchange between the 5GMS aware application (310) and the 5GMS application provider (330), for example, to provide service access information to the 5GMS aware application.

In various examples, the UE (301) may include many detailed subfunctions that can be used individually or controlled individually by the 5GMS aware application (310).

The 5GMS aware application (310) may include many functions. Examples include peripheral discovery, notifications, and social network integration. The 5GMS aware application (310) may also include functions that are equivalent to ones provided by the 5GMS client (320) and may only use a subset of the 5GMS client functions.

For example, the media streamer (322) can include the following functions:

Media Capturing: Devices, such as video cameras or microphones, that transform an analog media signal into digital media data.

Media Encoder(s): Compress the media data.

Metrics Measurement and Logging: execution of QoE metrics measurement and logging by the media streamer (322) in accordance with the metrics configuration.

Media upstream client: encapsulates encoded media data and pushes it upstream. In some examples, the media upstream client function maps to a FLUS media function in a FLUS Source specified in 3GPP TS 26.238: "Uplink Streaming".

For example, the media session handler (321) can include the following functions:

Metrics Collection and Reporting: execution of the collection of QoE metrics measurement logs from the media streamer (322) by the media session handler (321) for subsequent metrics reporting to the 5GMS AF (340), in accordance with the metrics configuration.

Network Assistance: uplink streaming delivery assisting functions provided by the network to the 5GMS client (320) and media streamer (322) in the form of bit rate recommendation (or throughput estimation) and/or delivery boost. Network Assistance functionality may be supported by the 5GMS AF (340) or access network bitrate recommendation (ANBR)-based RAN signaling mechanisms. In an example, this function maps to a FLUS assistance function specified in 3GPP TS 26.238: "Uplink Streaming".

Media Remote Control: receives control commands from the 5GMS AF (340).

Core Function: configures the 5GMS AS (350) for uplink streaming reception. In an example, this function maps to a FLUS control function in a FLUS source specified in 3GPP TS 26.238: "Uplink Streaming".

In a process for uplink media streaming, a user of the system (300) can create, modify, delete sessions between the 5GMS client (320) and the 5GMS AS (350). In an example, the 5GMS AF (340) can select and interact with the 5GMS AS (350) for resource reservations. For example, the 5GMS AS (350) can allocate M2 and M4 resources and communicate resource identifiers back to the 5GMS AF (340). The 5GMS AF (340) provide information about the provisioned resources (in the form of resource identifiers) for media session handling, egest, and uplink streaming to the 5GMS application provider (330). The resource identifiers for media session handling and uplink streaming are provided to the 5GMSu Client to access the selected features in an example.

In an example, the 5GMS client (320) can start the uplink streaming by activating its uplink streaming session. The uplink streaming session is active from the time at which the 5GMS aware application (310) activates the transmission of an uplink streaming service until its termination.

In an example, the 5GMS aware Application (310) receives application metadata from the 5GMS application provider (330) before transmitting the uplink streaming media. The application metadata can include service access information, which acts as an entry point for the 5GMS client (320) to start the uplink streaming session. The 5GMS client (320) may either receive the service access information from the 5GMS application provider (330) (using a not standardized interface) or instructions for a remote control session. For example, when remote control is activated, the 5GMS client (320) is remotely configured and controlled by the 5GMS AF (350).

In an embodiment, an uplink streaming process using the system (300) can be performed as follows. In a first step, the 5GMS application provider (330) creates a provisioning session and starts provisioning the usage of the system (300). During the establishment phase, the used features are negotiated, and detailed configurations are exchanged across the elements within the system (300). The 5GMS application provider (330) receives service access information for M5 (media session handling) and, when media content reception is negotiated, service access information for M2 (Egest) and M4 (Uplink Streaming). This information is needed by the 5GMS client (320) to access the service. Depending on the provisioning, only remote configuration information may be provided.

In a second step, when the 5GMS AF (340) and the 5GMS AS (350) are operated by the same provider (e.g., the MNO), there may be interactions between the 5GMS AF (340) and 5GMS AS (350), for example, to allocate 5GMS egest and uplink streaming resources. The 5GMS AS (340) provides resource identifiers for the allocated resources to the 5GMS AF (340), which then provides the information to the 5GMS application provider (330). In a third step, the 5GMS application provider provides the service announcement information to the 5GMS aware application (310). This may include manual entering of parameters. The service announcement can include either the full service access information (i.e. details for media session handling (M5) and for media streaming access (M4)) or only a remote configuration and control address (5GMS AF URL). In the latter case, the 5GMS client (320) retrieves the services access information in a later step.

In a fourth step, the 5GMS aware application (310) configures and starts the 5GMS client (320). In a fifth step, when the 5GMS aware application decides to activate the streaming service transmission, the service access information is provided to the 5GMS client (320). When remote configuration and control are activated, then the 5GMS AF configures and controls the 5GMS client remotely. In a sixth step, depending on the configurations, the 5GMS client (320) uses the media session handling API towards the 5GMS AF (340). The media session handling API is used for requesting different policy and charging treatments or 5GMS AF-based Network Assistance. In a seventh step, the 5GMS client (320) starts activating the uplink streaming session. In a final step, the 5GMS AS (350) publishes the content towards the 5GMS application provider.

In an example, an uplink streaming session between the media streamer (322) and the 5GMS AS (350) can be established as follows. During provisioning, the media streamer (322) is provisioned with basic information, such as the 5GMS AF and 5GMS AS addresses. For some devices, only the remote control information is provisioned, and all additional parameters are retrieved from a remote controller. The 5GMS aware application (310) starts uplink media streaming, and in some examples, provide a media streaming entry to the media streamer (322).

When the remote control is provisioned, a transport session for remote control is established. The 5GMS client (320) starts waiting for incoming remote control commands. The 5GMS client (320) receives a remote control command to start uplink streaming (either now or with a timestamp). The Remote control command may contain details of the 5GMS AS (350), etc. The 5GMS client establishes the uplink transport session. The 5GMS client (320) establishes the uplink media streaming session.

When client assistance is provisioned, the 5GMS client (320) establishes the assistance channel to the provisioned 5GMS AF(s). When server assistance is desired (e.g., for QoS or charging), the 5GMS AS (350) establishes an assistance session with the 5GMS AF (340).

In some examples, the 5GMS Application Provider (330) may request media processing to be performed on its media data. This can be instantiated as part of the Uplink or Downlink streaming. For the uplink, in an example, the FLUS as specified by 3GPP TS 26.238 provides measures to describe the required media processing as part of the FLUS session creation request. The media processing can be performed by a set of 5GMS AS(s), which may be combined together to build complex media processing workflows. The 5GMS AF (340) can coordinate the media processing and ensures that the appropriate QoS and traffic handling for the session are provided.

In some examples, FLUS is used for uplink media processing provisioning. In an example, FLUS is used for the provisioning of media processing by a FLUS Source to a FLUS Sink. The FLUS Sink can consist of a FLUS 5GMS AF and a FLUS 5GMS AS. The 5GMS AF instructs the 5GMS AS to perform processing of the media according to the provided media processing document (e.g., an NBMP WDD). Alternatively, the 5GMS AF can control to share the media processing load among multiple 5GMS AS(s).

In an example, an uplink network-based media processing process can include the following steps. In a first step, an uplink streaming configuration is set up. The 5GMS application provider (330) sends a request to start a FLUS session to the 5GMS AF (340). The request contains a description of the media processing that is to be performed by the 5GMS AS (350). Depending on the configuration, one or multiple 5GMS AS(s) may be involved.

In a second step, 5GMSu AS(s) is provisioned. The 5GMS AF (340) parses the media processing description and provisions the 5GMS AS (350) that will perform the requested processing. If the requested processing is not accepted, the session creation fails. In a third step, 5GMS AS (350) becomes ready. The 5GMS AS (350) confirms the correct configuration and informs the 5GMS AF (340) that it is ready to receive and process media as requested.

In a fourth step, the 5GMS AF (340) confirms the successful creation of the uplink streaming configuration to the 5GMS application provider (330). In a fifth step, the uplink streaming session starts. The session is triggered in the 5GMS client (320). In a sixth step, media content is streamed from the 5GMS client (320) to the 5GMS AS (350). The 5GMS AS (350) processes the received media based on the provisioned media processing.

III. Framework for Live Uplink Streaming (FLUS)

The Framework for Live Uplink Streaming (FLUS) enables live media streaming from a source entity to a sink entity. FLUS provides an IP multimedia subsystem (IMS)-based and a non-IMS-based instantiation. The IMS/MTSI-based instantiation enables the establishment of live media streaming between two UEs or between a source entity and a sink entity within and across operator networks. Compared with MTSI, where limited types of QoS for speech or video media are used, FLUS can provide a broader range of QoS operation, for example, in the maximum delay, available bandwidth or target packet loss rate. In the non-IMS-based instantiation, it is possible to operate FLUS as a more generic framework that is controlled through a RESTful API and that supports other media plane protocols (i.e., not based on IMS or MTSI).

A FLUS source entity and a FLUS sink entity can support the point-to-point transmission of speech/audio, video, and text by media handling (e.g., signaling, transport, packet-loss handling, and adaptation). FLUS can provide a reliable and interoperable service with a predictable media quality while allowing for flexibility in the service offerings. A FLUS source entity, which may be embedded in a single UE, or distributed among a UE and separate audio-visual capture devices, may support all or a subset of the features specified in this document.

When used as a generic framework, FLUS control plane (F-C) procedures for establishing the FLUS session are used. For example, configuration of media formats and codecs can follow the requirements of the respective service. When offered as part of a 3GPP IMS/MTSI service, the FLUS source and the FLUS sink entities can support the IMS control plane and media plane procedures. For example, the service quality can be determined by the MTSI service policy.

Figure 4:
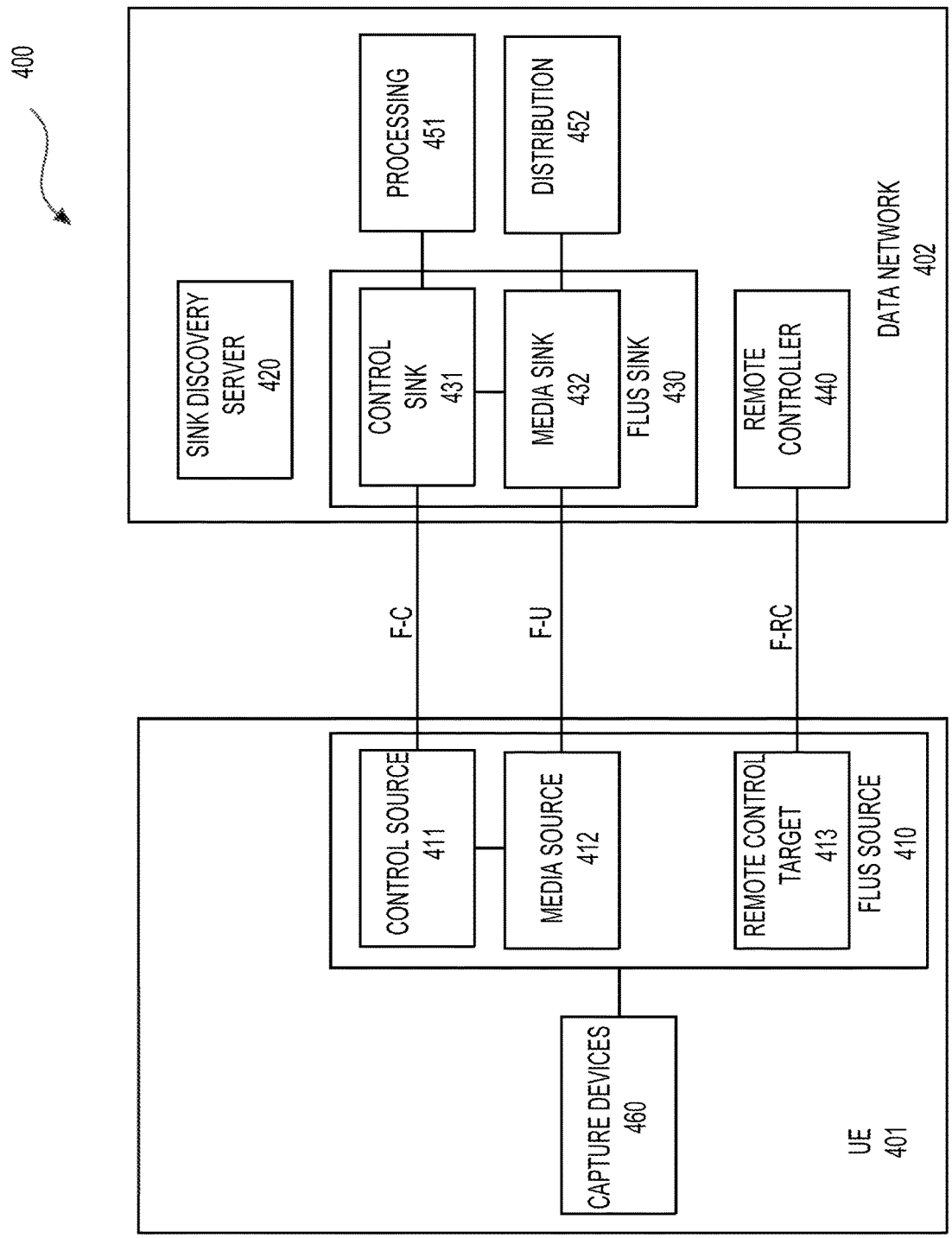
FIG. 4 shows an example of a framework for live uplink streaming (FLUS) system (400) for providing an uplink streaming service.

FIG. 4 shows an example of a FLUS system (400) for providing an uplink streaming service. The system (400) can include a UE (401) and a data network (402). The UE (401) can include a FLUS source (410) and capture devices (460). The FLUS source (410) can include a control source (411), a media source (412), and a remote control target (413). The data network (402) can include a sink discovery server (420), a FLUS sink (430), remote controller (440), a processing function (451), and a distribution function (452). The FLUS sink (430) can include a control sink (431) and a media sink (432). Those elements are coupled together as shown in FIG. 4. In addition, functions or elements in FIG. 4 are not required to be located in the same physical device and can be spread over multiple physical devices and interconnected via other interfaces.

In an example, the FLUS source (410) receives media content from one or more capture devices (460). The capture devices (460) can be parts of the UE (401) or connected to the UE (401). The FLUS sink (430) may forward media content to the processing function (451) or the distribution function (452). In some examples, the FLUS sink (430) may act as a media gateway function (MGW) and/or a 5G application function (AF). The sink discovery server can provide functionality for the FLUS source (410) to discover available FLUS sinks. The FLUS sink (430) provides functionality to query its capabilities and FLUS sessions. In an example, the FLUS source (410) and the FLUS sink (430) can mutually authenticate and authorize each other.

In some examples, the control plane functionality of the control source (411) and the control sink (431) includes the associated processing by the FLUS sink (430) of the uploaded media for subsequent downstream distribution, FLUS media instantiation selection, and configuration of static metadata for the media session. The remote control target (413) on the FLUS source (410) can receive control messages from the remote controller (440). The messages affect the behavior of the media source (412) in the FLUS source (410). Examples of commands issued to the remote control target (413) are the start or stop of the media upstreaming process in the FLUS source (410). The FLUS user plane functionality includes setup of one or more media sessions and subsequent media data transmission via media streams.

In some examples, the control source (411) can be configured to select a FLUS media instantiation, provision static metadata associated with each media session present in the FLUS session, and discover, select and configure the processing and distribution sub-functions (451 and 452). The remote controller (440) can be configured to provide the media sink information to the FLUS source, select a FLUS media instantiation, and determine capture device settings and other FLUS source parameters.

Multiple media streams may be established for one FLUS session. A Media stream may contain media components of a single content type (e.g., audio), or media components of different content types (e.g., audio and video). A FLUS session may be composed of more than one media stream containing the same content type, for example, multiple media streams of video.

Generally, when a FLUS sink is located in a UE, and the UE renders the received media content directly, the PLUS session may be implicitly present. For example, the FLUS sink may be realized through IMS/MTSI. When a FLUS sink is located on a network side and provides media gateway functionality, the FLUS session is used to select the media session instantiation and to configure any processing and distribution related sub-functions. In some examples, an MPEG NBMP Workflow Description Document (WDD) may be used to describe the media processing tasks at the FLUS sink to be performed on received media components from the FLUS source.

In an example, a PLUS session establishment procedure can create a FLUS session resource, which is then configured through a FLUS session update procedure, for example, resulting in the selection of a media session instantiation. The FLUS session update procedure includes the following FLUS session configuration parameters: selection of the media session instantiation, provision of session-specific metadata, setting a description (e.g., an NBMP WDD) of the processing of the media data that the FLUS sink is to perform, and configuration of the distribution and storage options for the media data.

In an example, the FLUS source (410) can discover the capabilities of the FLUS sink (430). The capabilities of the FLUS sink (430) can include various processing capabilities and distribution capabilities. Examples of the processing capabilities include:

Supported input formats, codecs and codec profiles/levels, resolutions, frame rates,
Transcoding with formats, output codecs, codec profiles/levels, bitrates, etc.,
Reformatting with output format,
Combination of input Media streams (e.g. network-based stitching, mixing),
Recognition or synthesis of media.
Examples of distribution capabilities include:
Storage capabilities,
CDN Origin capabilities and CDN Origin Server base URLs,
Forwarding, including supported forwarding protocol and associated security procedures.

In some examples, FLUS supports different source systems. A source system description contains metadata on the captured media sources and their inter-relationships and is made available to a FLUS sink such that the FLUS sink can properly interpret and process the received media streams. A source system is identified by a unique identifier. That identifier and the corresponding source system description are provided to the FLUS sink during the FLUS session establishment and/or update procedures. The interactions between a FLUS source and a FLUS sink can be based on HTTP-based RESTful API request/response mechanisms.

An MPEG NBMP Workflow Description Document (WDD) may be used to describe the media processing tasks at the FLUS sink (430) to be performed on received media components from the FLUS source (410). An NBMP WDD may be signaled as part of FLUS Sink configuration properties. For example, the control source (411) may first fetch a current FLUS sink configuration using the Get FLUS sink configuration properties procedure. The control source (411) modifies the properties of a FLUS sink configuration resource. The procedure may allow modification of individual properties or all properties. In response to receiving the sink configuration resource, the control sink (431) updates the resource identified by the ID of the FLUS sink configuration.

IV. NBMP Deployment with Framework of Live Uplink Streaming (FLUS) and 5G Application Function (AF)

Figure 5:
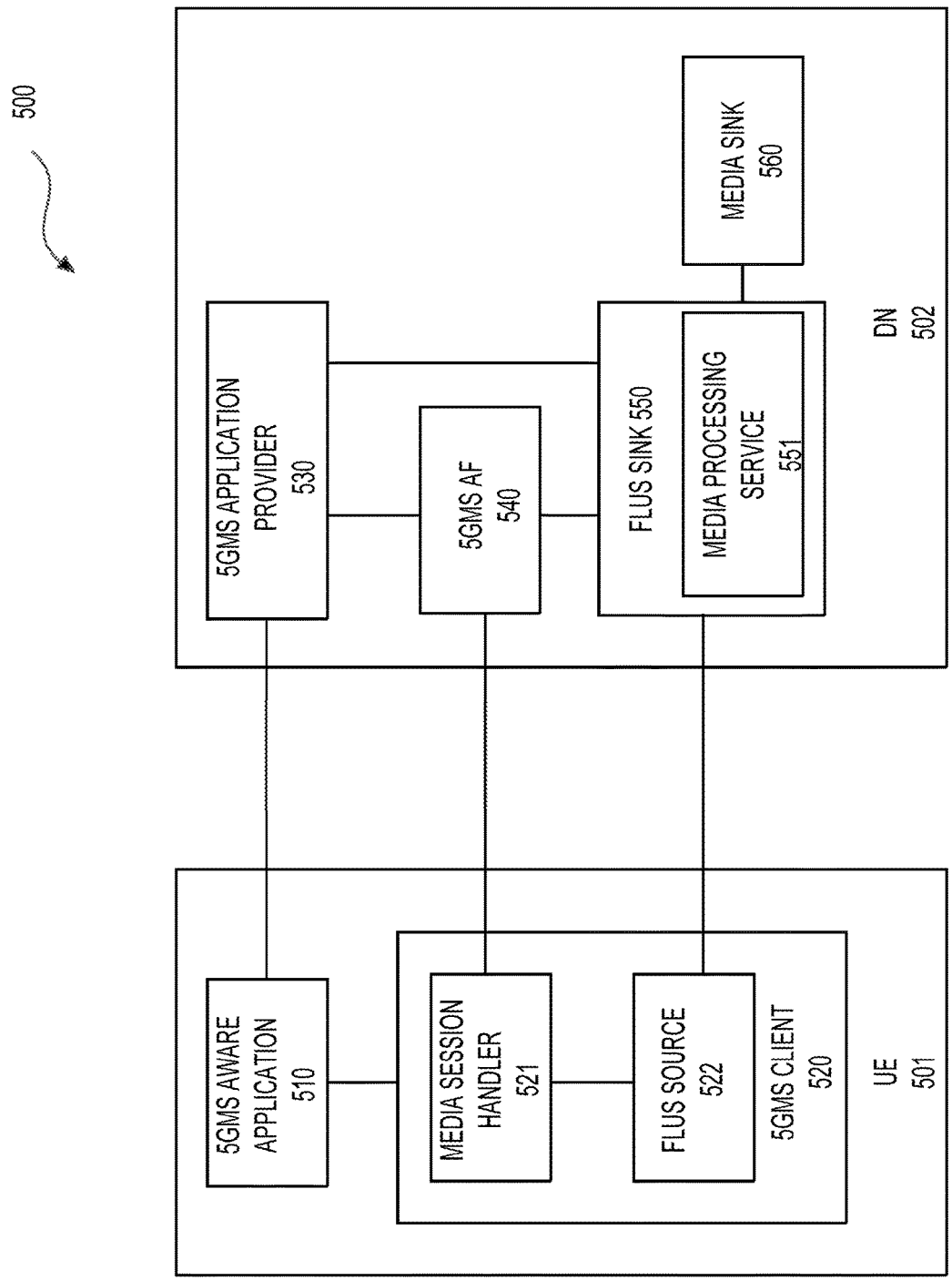
FIG. 5 shows a network-based media processing system (500) according to an embodiment of the disclosure.

FIG. 5 shows a network-based media processing system (500) according to an embodiment of the disclosure. The system (500) can be based on the 5GMS system (300), the FLUS system (400), and the NBMP system (100). In the system (500), a 5GMS architecture, a FLUS architecture, and an NBMP framework are combined together to realize a deployment of a network-based media processing. Protocols of those three architectures or frameworks can operate at different levels. A low-level protocol can provide services to a high-level protocol.

The system (500) can include a UE (501) and a DN (502). The UE can include a 5GMS aware application (510) and a 5GMS client 520. The 5GMS client (520) can include a media session handler 521 and a FLUS source 522. The DN (502) can include a 5GMS application provider (530), a 5GMS AF (540), a FLUS sink (550), and a media sink (560).

The FLUS sink (550) can include a media processing service (MPS) module (551). Those elements can be coupled together as shown in FIG. 5.

In various deployment scenarios, the functions of the FLUS source (522) may be implemented in multiple ways. In an example, the FLUS source (522) is implemented as part of a media streamer, such as the media streamer (322). In an example, the FLUS source (522) is implemented as a media streamer and performs functions similar to that of the media streamer (322). In an example (not shown in FIG. 5), functions of the FLUS source (522) are distributed in a media streamer (e.g., the media streamer (322)) and a media session handler (e.g., the media session handler (321)).

Similarly, in various deployment scenarios, the functions of the FLUS sink (550) may be implemented in multiple ways. In an example, the FLUS sink (550) is implemented as part of a 5G application server (5GAS), such as the 5GMS AS (350). In an example, the FLUS sink (550) or a part of the FLUS sink (550) is implemented as a 5GAS. In an example, functions of the FLUS sink (550) can be distributed in a 5GMS AF (e.g., the 5GAF (340)) and a 5GMS AS (e.g., 5GMS AS (350)).

In some examples, the elements (501/502/510/520/521/522/530/540/550) in the system (500) can function and operate similarly as the elements (301/302/310/320/321/322/330/340/350), respectively, in the FIG. 3 example. For example, protocols and APIs defined for the 5GMS architecture can be used in the system (500) to support FLUS- and NBMP-related operations.

In some examples, the elements (522) and (550) in the system (500) can function and operate similarly as the elements (410) and (430), respectively, in the FIG. 4 example. For example, protocols and APIs defined for the FLUS architecture can be used in the system (500) for FLUS-related operations. In some examples, the MPS module (551) and the media sink (560) in the system (500) can function and operate similarly as the media processing entity (113) and the media sink (115), respectively, in the FIG. 1 example.

Figure 6:
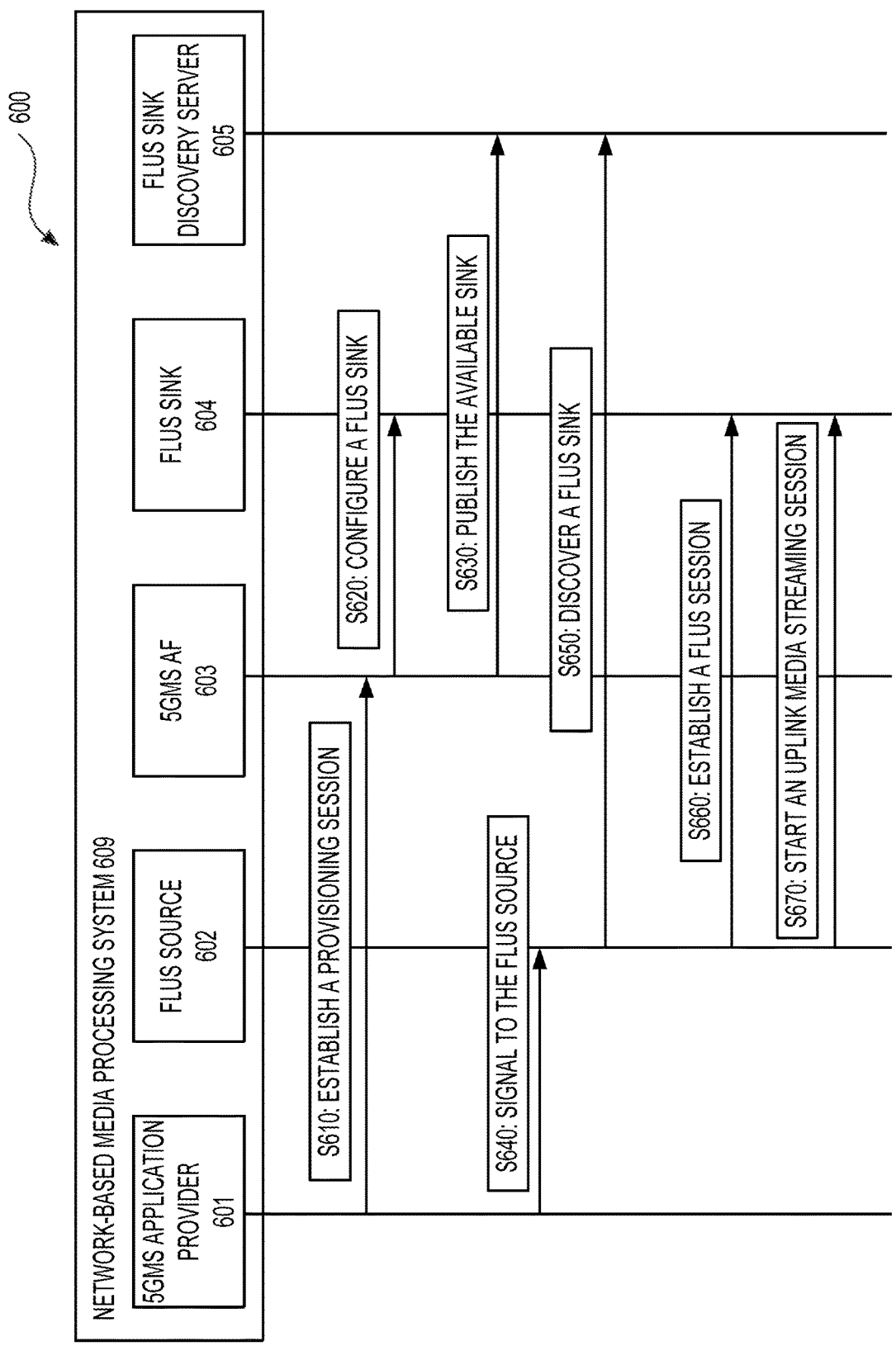
FIG. 6 shows a process (600) of network-based media processing according to an embodiment of the disclosure.

FIG. 6 shows a process (600) of network-based media processing according to an embodiment of the disclosure. The process (600) can include steps from (S610) to (S670). The process (600) can be performed among a set of elements in a network-based media processing system (609). Those elements can include a 5GMS application provider (601), a FLUS source (602), a 5GMS AF (603), a FLUS sink (604), and a FLUS sink discovery server (605).

In an example, the elements (601-604) can correspond to the elements (530/522/540/550), respectively, and be deployed as shown in FIG. 5. In other examples, the elements (601-604) can be deployed differently from what is shown in FIG. 5. For example, sub-functions of the FLUS source (602) may be distributed in a media session handler and a FLUS source. Sub-functions of the FLUS sink (604) may be distributed in a 5GAF and a 5GAF. An MPS module may be separate from the FLUS sink (604), which is different from the FLUS sink (550) including the MPS module (551).

At (S610), the 5GMS application provider (601) can establish a provisioning session with the 5GMS AF (603) to configure the 5GMS AF (603). For example, QoS requirement related parameters can be provided to the 5GMS AF (603). A processing template can be provided to the 5GMS AF (603). For example, the processing template may specify resources (e.g., CPU, memory, and the like) needed for respective network-based media processing. Additionally and optionally, a description of intended network-based media processing can be provided to the 5GMS AF (603). In an example, the description can take a form of an NBMP WDD.

At (S620), the 5GMS AF (603) can configure the FLUS sink (604) based on configurations received from the 5GMS application provider (601). For example, based on the QoS configuration received from the 5GMS application provider (601), the 5GMS AF (603) can command respective 5G functions to prepare network resources for transporting media content from the FLUS source (602) to the FLUS sink (604). Based on the processing template, the 5GMS AF (603) can command the FLUS sink (604) to prepare computation resources for the intended network-based media processing. In various deployment scenarios, there can be different options for configuring the FLUS sink (604).

In a first case, the 5GMS AF (603) can configure a single FLUS sink (e.g., the FLUS sink (604)) and instantiate an NBMP workflow in the FLUS sink (604). For example, an NBMP WDD can be received from the 5GMS AF (603) or the 5GMS application provider (601) at the FLUS sink (604). Based on this NBMP WDD, the NBMP workflow can be initiated at an MPS module in the FLUS sink (604).

In a second case, the 5GMS AF (603) can configure one or more FLUS sinks. However, no NBMP WDD is received from the 5GMS AF (603), and no NBMP workflow is instantiated at the one or more FLUS sinks.

In a third case, the 5GMS AF (603) can configure one or more FLUS sinks and provide an address of the FLUS source (602) to each of the multiple FLUS sinks. However, no NBMP workflow is instantiated in those FLUS sinks. The NBMP WDD may be configured to those FLUS sinks.

In a fourth case, corresponding to different groups of UEs, multiple FLUS sinks can be configured with the methods corresponding to the first, second, and third cases. For example, for the first group of UEs, the configuration in the first case can be performed for each UE. The address of the configured FLUS sink can be informed to the corresponding UE via communications between a 5GMS application in the corresponding UE and the 5GMS application provider (601) or through the FLUS sink discovery server (605).

For the second group of UEs, the configuration in the second case can be performed over multiple FLUS sinks that can subsequently be published on the FLUS sink discovery server (605). Each UE in the second group of UEs can discover and select one FLUS sink from multiple candidates listed on the FLUS sink discovery server (605).

For the third group of UEs, similar to the second group of UEs, the configuration in the third case can be performed over multiple FLUS sinks that can subsequently be published on the FLUS sink discovery server (605). Each UE in the third group of UEs can discover and select one FLUS sink from multiple candidates listed on the FLUS sink discovery server (605).

At (S630), the 5GMS AF (603) can publish the available sinks to the FLUS sink discovery server (605). For example, the FLUS sinks that are already configured can be listed on the FLUS sink discovery server (605). Capabilities and/or configurations can be provided for each listed FLUS sink.

At (S640), the 5GMS application provider (601) can signal to a 5GMS application (not shown in FIG. 6) in a UE carrying the FLUS source (602) that a FLUS sink is ready for initiating a network-based media processing process, and a FLUS session can be initiated.

At (S650), the 5GMS FLUS source (602) can perform a FLUS sink discovery process to select a FLUS sink from the candidate FLUS sinks listed on the FLUS sink discovery server (605). For example, the 5GMS FLUS source (602) can query the FLUS sink discovery server (605) to get the capability and/or configuration information. Based on that information, a candidate FLUS sink can be selected.

At (S660), the 5GMS FLUS source (602) can establish a connection (a session) with the selected FLUS sink. Depending on the deployment and configuration scenarios of the system (609), different operations can be performed.

In a first scenario corresponding to the first case at (S620), an NBMP workflow has already been instantiated by the 5GMS AF (603) at the FLUS sink (604). For example, controlled by the 5GMS application provider (601), the NBMP workflow is capable of intended media processing for media content streamed from the FLUS source (602). The FLUS source (602) can establish the session with the FLUS sink (604) based on FLUS protocols without additional operations for transmitting an NBMP WDD or instantiating the NBMP workflow.

In a second scenario corresponding to the second case at (S620), the FLUS sink (604) is configured, and resources for media processing has been assigned. However, no NBMP workflow is instantiated. In this scenario, while establishing the session with the FLUS sink (604), the FLUS source (602) may request for instantiation of an NBMP workflow. AN NBMP WDD can be included in the request. In response, the FLUS sink (604) may instantiate the NBMP workflow based on the received NBMP WDD.

When multiple FLUS sinks are configured in the second case at (S620) and listed in the FLUS sink discovery server (605), the FLUS source (602) may select one of the multiple listed FLUS sinks to establish the session during the FLUS sink discovery process at (S650).

In a third scenario corresponding to the third case at (S620), the FLUS sink (604) already has the address of the FLUS source (602) configured to it previously and an NBMP WDD associated with this address. While the session is being established between the FLUS source (602) and the FLUS sink (604), the FLUS source (602) can provide its address to the FLUS sink (604) without signaling an NBMP WDD. Upon receiving the address of the FLUS source (602), the FLUS sink (604) can instantiate an NBMP workflow using the available NBMP WDD associated with the address of the FLUS source (602).

There can be different technology advantages and disadvantages when comparing the above three deployment scenarios. The first scenario has a higher responding speed (because an active media processing workflow is instantly available) and a simplified API (no signaling of an NBMP WDD), however, at the cost of computation resource occupancy (always occupied even without a user). The second scenario has a lower level of computation resource occupancy, a more complicated API, and a lower responding speed. The third scenario has a simplified API or signaling protocol (an address is used to indicate a required media processing and no signaling of an NBMP WDD), a lower level of computation resources, and a lower responding speed.

In addition, the first scenario deployment can be used for providing network-based media processing at a specific PLUS sink for a specific UE. In contrast, multiple FLUS sinks can be configured in advance and listed in a FLUS sink discovery server in the second and third deployment scenarios. Multiple UEs can each select a suitable FLUS sink to request intended network-based media processing.

At (S670), the FLUS source (602) starts an uplink media streaming session to stream media content from the FLUS source (602) the FLUS sink (604). The media content is input to the NBMP workflow and processed with the intended network-based media processing. Output from the NBMP workflow can subsequently be distributed to a plurality of media sinks (e.g., UEs), or transmitted to the 5GMS application provider (601). The process (600) can terminate after (S670).

Figure 7:
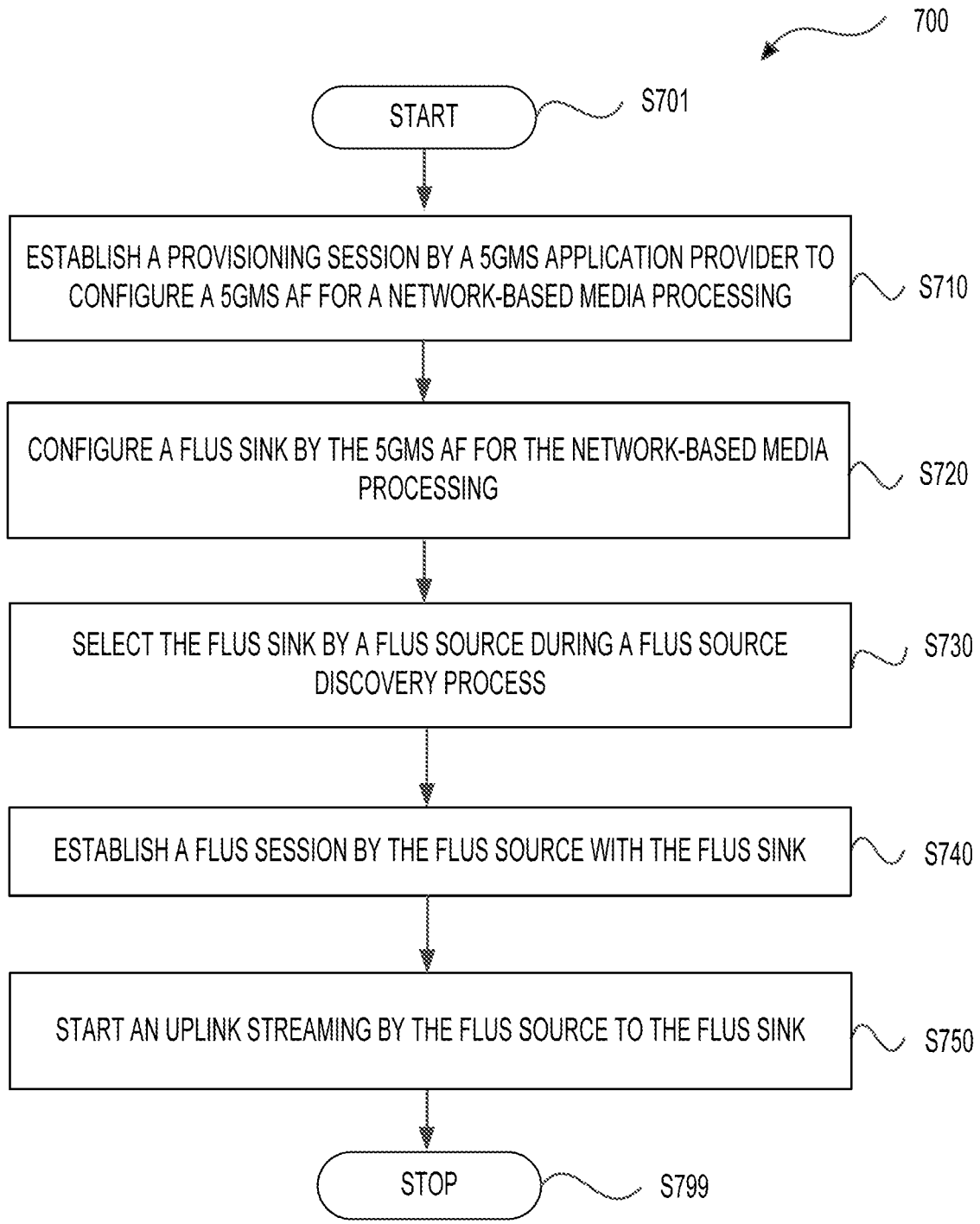
FIG. 7 shows a process (700) of NBMP deployment with a FLUS and a 5GMS application function (AF) according to an embodiment of the disclosure.

FIG. 7 shows a process (700) of NBMP deployment with a FLUS and a 5GMS AF according to an embodiment of the disclosure. The process (700) can start from (S701) and proceed to (S710).

At (S710), a provisioning session can be established by a 5GMS application provider with the 5GMS AF. During the provisioning process, the 5GMS application provider configures the 5GMS AF for network-based media processing. For example, the 5GMS application provider can provide QoS parameters and processing templates the 5GMS AF. In an example, the 5GMS application provider provides the 5GMS AF with an NBMP workflow description document (WDD) for setting up the network-based media processing through 5GMS AF. In an example, the 5GMS application provider requests the 5GMS AF to configure a media process by providing an NBMP WDD corresponding to the network-based media processing, and the 5GMS AF configures a FLUS sink and instantiates an NBMP workflow in the FLUS sink based on the NBMP WDD.

At (S720), a FLUS sink can be configured by the 5GMS AF for the network-based media processing. In an example, the 5GMS application provider configures the 5GMS AF with an NBMP workflow description document (WDD) corresponding to the network-based media processing. The 5GMS AF accordingly configures the FLUS sink and instantiate an NBMP workflow in the FLUS sink based on the NBMP WDD corresponding to the network-based media processing.

In another example, the 5GMS AF provides an address of the FLUS source and an NBMP WDD corresponding to the network-based media processing to the FLUS sink. However, no instantiation of an NBMP workflow for the network-based media processing is performed at the FLUS sink.

At (S730), the FLUS sink is selected by a FLUS source during a FLUS source discovery process. For example, the PLUS sink capable of NBMP media processing can be published by the 5GMS AF to a FLUS sink discovery server. The FLUS source can discover the PLUS sink among one or more FLUS sinks listed on the FLUS sink discovery server. The FLUS source selects the FLUS sink based on information on the FLUS sink discovery server that the FLUS sink is capable of performing the network-based media processing.

At (S740), a FLUS session can be established by the FLUS source with the FLUS sink. In an example, a 5GMS aware application at a UE can request for instantiation of an NBMP workflow for the network-based media processing through FLUS source. Accordingly, the FLUS source at the UE can transmit a request for the instantiation of the NBMP workflow for the network-based media processing to the FLUS sink with an NBMP WDD corresponding to the NBMP workflow included in the request. In response to receiving the request from the FLUS source, the FLUS sink can instantiate the NBMP workflow based on the NBMP WDD.

In another example, the FLUS sink is configured with an address of the FLUS source and an NBMP WDD corresponding to the network-based media processing by the 5GMS AF. Under such a configuration, in response to a request for establishing the FLUS session from the FLUS source including the address of the FLUS source, the FLUS sink can instantiate an NBMP workflow based on the NBMP WDD.

At (S750), an uplink streaming can be started by the FLUS source to the FLUS sink. At the FLUS sink, media content of the uplink streaming can be processed with the network-based media processing. The process (700) can proceed to (S799) and terminate at (S799).

Figure 8:
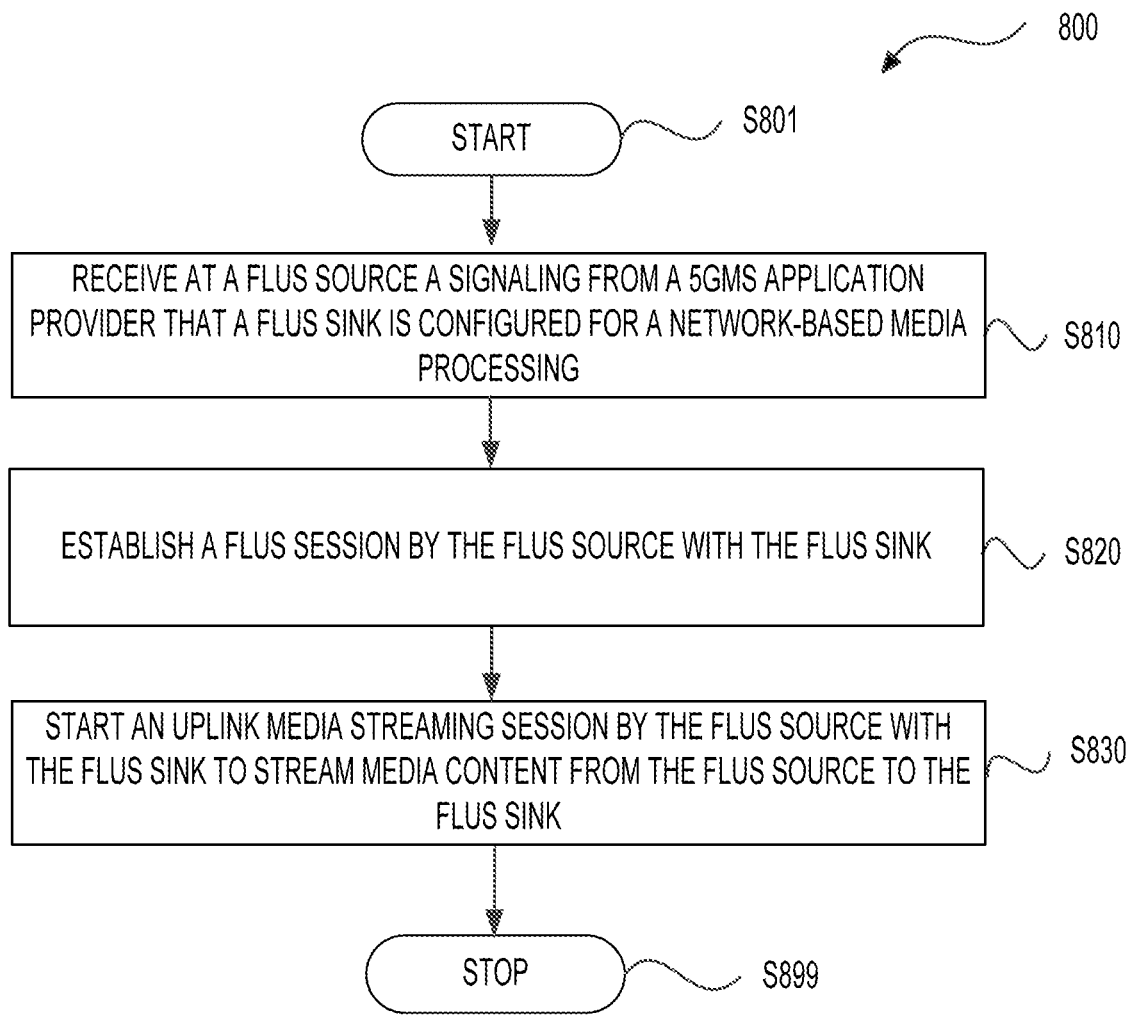
FIG. 8 shows a process (800) of NBMP deployment with FLUS and 5GMS AF according to an embodiment of the disclosure.

FIG. 8 shows a process (800) of NBMP deployment with FLUS and 5GMS AF according to an embodiment of the disclosure. The process (800) can be performed by a FLUS source. The process (800) can start from (S801) and proceed to (S810).

At (S810), a signaling can be received at the FLUS source from a 5GMS application provider. The signaling can indicate that a FLUS sink is configured for a network-based media processing.

At (S820), a FLUS session can be established by the FLUS source with the FLUS sink. In some examples, an NBMP workflow can be instantiated at the FLUS sink based on an NBMP WDD for performing the network-based media processing.

At (S830), an uplink media streaming session can be started by the FLUS source with the FLUS sink to stream media content from the FLUS source to the FLUS sink. The media content is processed with the network-based media processing at the FLUS sink. The process (800) can proceed to (S899) and terminate at (S899).

Figure 9:
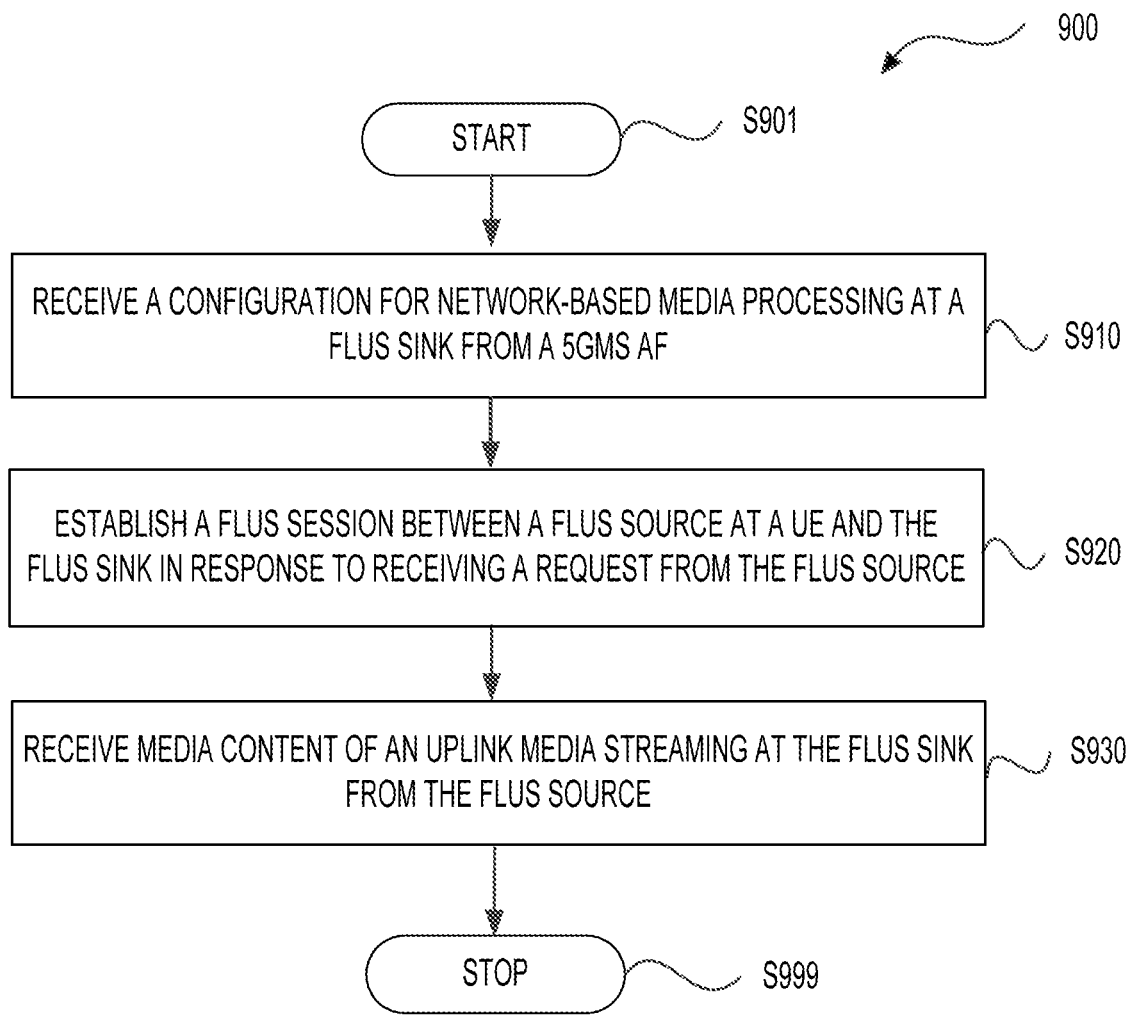
FIG. 9 shows a process (900) of NBMP deployment with FLUS and 5GMS AF according to an embodiment of the disclosure.

FIG. 9 shows a process (900) of NBMP deployment with FLUS and 5GMS AF according to an embodiment of the disclosure. The process (900) can be performed by a FLUS sink. The process (900) can start from (S901) and proceed to (S910).

At (S910), a configuration for network-based media processing can be received at the FLUS sink from the 5GMS AF.

At (S920), a FLUS session can be established between a FLUS source at a UE and the FLUS sink in response to receiving a request from the FLUS source.

At (S930), media content of an uplink media streaming can be received at the FLUS sink from the FLUS source. The media content of the uplink media streaming can be processed with the network-based media processing. The process (900) can proceed to (S999) and terminate at (S999).

V. Computer System

The methods, embodiments, entities, or functions disclosed herein may be implemented by processing circuitry (e.g., one or more processors or one or more integrated circuits). In one example, the one or more processors execute a program that is stored in a non-transitory computer-readable medium to perform the methods, embodiments, or functions disclosed herein. The program can be coded using any suitable machine code or computer language that may be subject to assembly, compilation, linking, or like mechanisms to create code comprising instructions that can be executed directly, or through interpretation, micro-code execution, and the like, by one or more CPUs, GPUs, and the like. The instructions can be executed on various types of computers or components thereof, including, for example, personal computers, tablet computers, servers, smartphones, gaming devices, internet of things devices, and the like.

Figure 10:
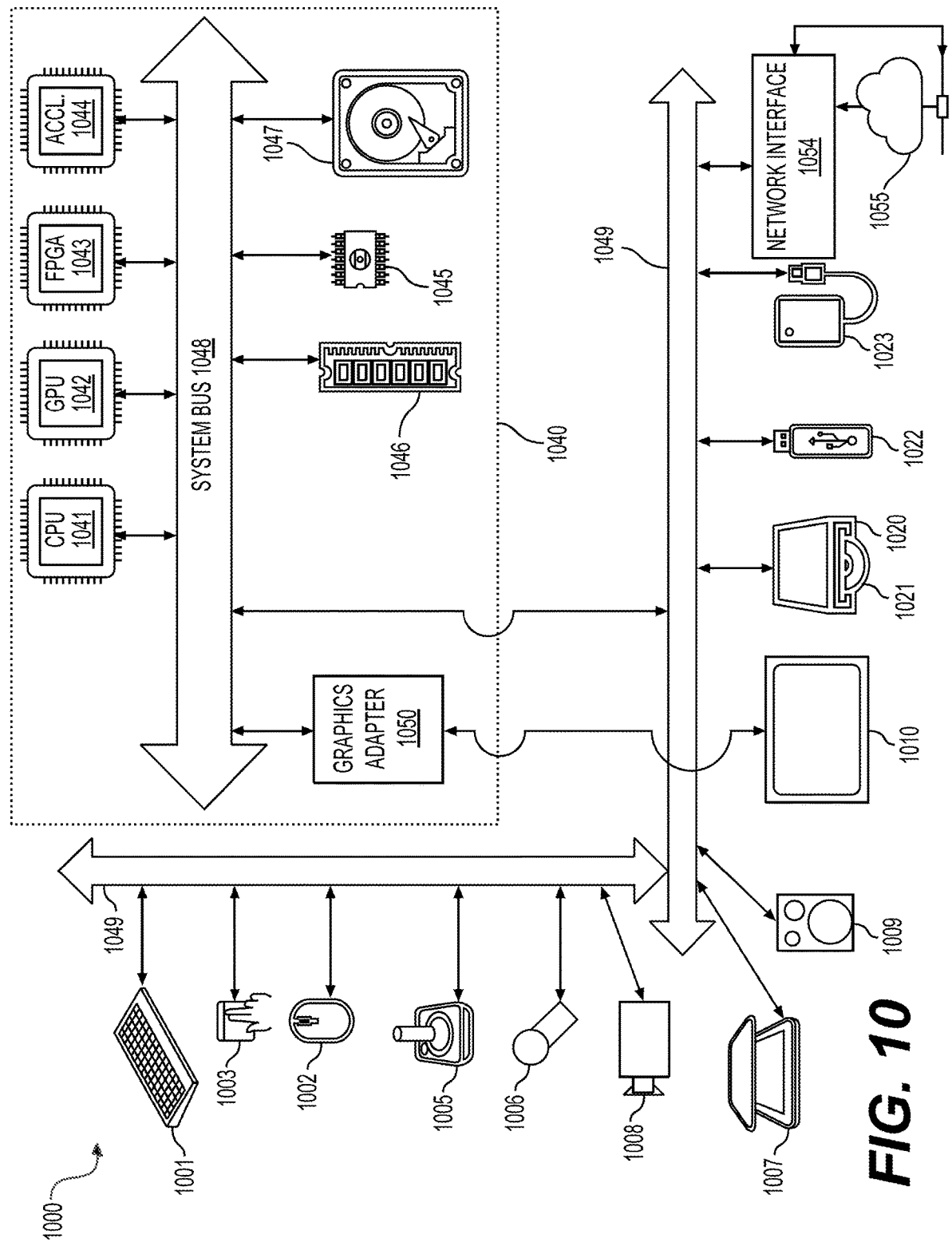
FIG. 10 shows a computer system (1000) suitable for implementing certain embodiments of the disclosed subject matter.

FIG. 10 shows a computer system (1000) suitable for implementing certain embodiments of the disclosed subject matter. The components shown in FIG. 10 for the computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example, tactile feedback by the touch-screen (1010), data-glove (not shown), or joystick (1005), but there can also be tactile feedback devices that do not serve as input devices), audio output devices (such as speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid-state drive (1023), legacy magnetic media such as tape and floppy disc (not depicted), specialized ROM/ASIC/PLD based devices such as security dongles (not shown), and the like.

Those skilled in the art should also understand that term "computer-readable media" as used in connection with the presently disclosed subject matter does not encompass transmission media, carrier waves, or other transitory signals.

Computer system (1000) can also include an interface (1054) to one or more communication networks (1055). Networks can, for example, be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide-area digital networks to include cable TV, satellite TV, and terrestrial broadcast TV, vehicular and industrial to include CANBus, and so forth. Certain networks commonly require external network interface adaptors that attached to certain general-purpose data ports or peripheral buses (1049) (such as, for example, USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described herein.

The aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators (1044) for certain tasks, graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048) or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can also be stored in RAM (1046), whereas permanent data can be stored in the internal mass storage (1047). Fast storage and retrieval to any of the memory devices can be enabled through the use of cache memory, that can be closely associated with one or more CPU (1041), GPU (1042), mass storage (1047), ROM (1045), RAM (1046), and the like.

The computer-readable media can have computer code thereon for performing various computer-implemented operations. The media and computer code can be specially designed and constructed for the purposes of the present disclosure, or they can be of the kind well known and available to those with skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are non-transitory, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described above, including defining data structures stored in RAM (1046) and modifying such data structures according to the processes defined by the software. In addition or as an alternative, the computer system can provide functionality as a result of logic hardwired or otherwise embodied in a circuit (for example, accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of network-based media processing (NBMP) deployment with a framework for live uplink streaming (FLUS) and a fifth-generation media streaming (5GMS) application function (AF), comprising:
   establishing a provisioning session by a 5GMS application provider with the 5GMS AF in which the 5GMS application provider configures the 5GMS AF for a network-based media processing;
   configuring a FLUS sink by the 5GMS AF for the network-based media processing;
   sending signaling, by the 5GMS application provider, that indicates the FLUS sink is configured for the network-based media processing;
   selecting the FLUS sink by a FLUS source during a FLUS source discovery process;
   establishing a FLUS session by the FLUS source with the FLUS sink; and
   starting an uplink streaming by the FLUS source to the FLUS sink where media content of the uplink streaming is processed with the network-based media processing.

2. The method of claim 1, wherein the 5GMS application provider provides the 5GMS AF with an NBMP workflow description document (WDD) for setting up the network-based media processing through 5GMS AF.

3. The method of claim 2, wherein the configuring the FLUS sink by the 5GMS AF includes:
   configuring the FLUS sink; and
   instantiating an NBMP workflow in the FLUS sink based on the NBMP WDD corresponding to the network-based media processing.

4. The method of claim 1, wherein the configuring the FLUS sink by the 5GMS AF includes:
   providing an address of the FLUS source and an NBMP workflow description document (WDD) corresponding to the network-based media processing by the 5GMS AF to the FLUS sink, wherein no instantiation of an NBMP workflow for the network-based media processing is performed at the FLUS sink.

5. The method of claim 1, wherein the FLUS source discovery process includes:
   publishing the FLUS sink capable of the network-based media processing by the 5GMS AF to a FLUS sink discovery server; and
   discovering the FLUS sink by the FLUS source among one or more FLUS sinks listed on the FLUS sink discovery server wherein the FLUS source selects the FLUS sink based on information on the FLUS sink discovery server that the FLUS sink is capable of performing the network-based media processing.

6. The method of claim 1, wherein the establishing the FLUS session by the FLUS source with the FLUS sink includes:
   requesting by a 5GMS aware application at a user equipment (UE) for instantiation of an NBMP workflow for the network-based media processing through the FLUS source; and
   transmitting a request for the instantiation of the NBMP workflow for the network-based media processing by the FLUS source at the UE to the FLUS sink with an NBMP workflow description document (WDD) corresponding to the NBMP workflow included in the request.

7. The method of claim 1, wherein the establishing the FLUS session by the FLUS source with the FLUS sink includes:
   instantiating by the FLUS sink an NBMP workflow based on an NBMP workflow description document (WDD) in response to a request for establishing the FLUS session from the FLUS source including an address of the FLUS source when the FLUS sink is configured with the address of the FLUS source and the NBMP WDD corresponding to the network-based media processing by the 5GMS AF.

8. A method of network-based media processing (NBMP) deployment with a framework for live uplink streaming (FLUS) and a fifth-generation media streaming (5GMS) application function (AF), comprising:
   receiving at a FLUS source signaling from a 5GMS application provider that a FLUS sink is configured for a network-based media processing;
   establishing a FLUS session by the FLUS source with the FLUS sink; and
   starting an uplink media streaming session by the FLUS source with the FLUS sink to stream media content from the FLUS source to the FLUS sink where the media content is processed with the network-based media processing.

9. The method of claim 8, further comprising:
   performing by the FLUS source a FLUS sink discovery process to select the FLUS sink from a set of candidate FLUS sinks listed on a FLUS sink discovery server in response to receiving at the FLUS source the signaling from the 5GMS application provider, the selection of the FLUS sink being based on whether the FLUS sink is capable of performing the network-based media processing.

10. The method of claim 8, wherein the establishing the FLUS session by the FLUS source with the FLUS sink includes:
   transmitting by the FLUS source at a user equipment (UE) a request for instantiation of an NBMP workflow for the network-based media processing to the FLUS sink with an NBMP workflow description document (WDD) corresponding to the NBMP workflow included in the request in response to a request by a 5GMS aware application at the UE for the instantiation of the NBMP workflow for the network-based media processing.

11. The method of claim 8, wherein the establishing the FLUS session by the FLUS source with the FLUS sink includes:
transmitting a request for establishing the FLUS session from the FLUS source, the request including an address of the FLUS source to the FLUS sink,
wherein the FLUS sink is configured with the address of the FLUS source and an NBMP workflow description document (WDD) corresponding to the network-based media processing, and, in response to the request for establishing the FLUS session from the FLUS source, instantiates an NBMP workflow based on the corresponding NBMP WDD.

12. The method of claim 8, wherein a 5GMS application provider requests the 5GMS AF to configure a media process by providing an NBMP workflow description document (WDD) corresponding to the network-based media processing, and the 5GMS AF configures the FLUS sink and instantiates an NBMP workflow in the FLUS sink based on the NBMP WDD.

13. The method of claim 8, wherein the 5GMS AF provides an address of the FLUS source and an NBMP workflow description document (WDD)corresponding to the network-based media processing to the FLUS sink, and no instantiation of an NBMP workflow for the network-based media processing is performed at the FLUS sink.

14. A method of network-based media processing (NBMP) deployment with a framework for live uplink streaming (FLUS) and a fifth-generation media streaming (5GMS) application function (AF), comprising:
receiving a configuration for network-based media processing at a FLUS sink from the 5GMS AF;
establishing a FLUS session between a FLUS source at a user equipment (UE) and the FLUS sink in response to receiving a request from the FLUS source that receives signaling from a 5GMS application provider indicating that the FLUS sink is configured for the network-based media processing; and
receiving media content of an uplink media streaming at the FLUS sink from the FLUS source, wherein the media content of the uplink media streaming is processed with the network-based media processing.

15. The method of claim 14, wherein the receiving the configuration for the network-based media processing at the FLUS sink from the 5GMS AF includes:
receiving an NBMP workflow description document (WDD) corresponding to the network-based media processing; and
instantiating an NBMP workflow in the FLUS sink based on the NBMP WDD corresponding to the network-based media processing.

16. The method of claim 14, wherein the receiving the configuration for the network-based media processing at the FLUS sink from the 5GMS AF includes:
receiving an address of the FLUS source and an NBMP workflow description document (WDD) corresponding to the network-based media processing from the 5GMS AF at the FLUS sink, wherein no instantiation of an NBMP workflow for the network-based media processing is performed at the FLUS sink.

17. The method of claim 14, wherein the establishing the FLUS session between the FLUS source at the UE and the FLUS sink in response to receiving the request from the FLUS source includes:
receiving a request for instantiation of an NBMP workflow for the network-based media processing from the FLUS source at the FLUS sink with an NBMP workflow description document (WDD) corresponding to the NBMP workflow included in the request; and
instantiating the NBMP workflow for the network-based media processing based on the NBMP WDD corresponding to the NBMP workflow included in the request.

18. The method of claim 14, wherein the establishing the FLUS session between the FLUS source at the UE and the FLUS sink in response to receiving the request from the FLUS source includes:
receiving a request for establishing the FLUS session at the FLUS sink from the FLUS source, the request including an address of the FLUS source; and
instantiating an NBMP workflow based on an NBMP workflow description document (WDD) corresponding to the network-based media processing at the FLUS sink, wherein the FLUS sink is previously configured with the address of the FLUS source and the NBMP WDD corresponding to the network-based media processing.

19. The method of claim 14, wherein the 5GMS application provider configures the 5GMS AF with an NBMP workflow description document (WDD) corresponding to the network-based media processing.

20. The method of claim 14, wherein the FLUS source discovers the FLUS sink among one or more FLUS sinks listed on a FLUS sink discovery server, the FLUS source selecting the FLUS sink based on information on the FLUS sink discovery server that the FLUS sink is capable of performing the network-based media processing.

* * * * *